United States Patent
Hsu et al.

(10) Patent No.: US 10,512,890 B1
(45) Date of Patent: Dec. 24, 2019

(54) APPARATUS FOR MIXING MATERIALS WHICH HAVE A HIGH MIX PROPORTION/RATIO THEREBETWEEN AND PREPARATION PRODUCTION SYSTEM USING THE SAME

(71) Applicant: ASIA IC MIC-PROCESS, INC., Taipei (TW)

(72) Inventors: Hung-Hsin Hsu, Taipei (TW); Yan-Lan Chiou, Taipei (TW)

(73) Assignee: Asia IC Mic-Process, Inc., Taipei (TW)

( * ) Notice: Subject to any disclaimer, the term of this patent is extended or adjusted under 35 U.S.C. 154(b) by 0 days.

(21) Appl. No.: 16/391,503

(22) Filed: Apr. 23, 2019

(30) Foreign Application Priority Data

Feb. 21, 2019 (TW) .............................. 108105890 A (51) Int. Cl.
| | | |
|---|---|---|
| *B01J 19/26* | (2006.01) | |
| *B01J 14/00* | (2006.01) | |
| *B01J 19/00* | (2006.01) | |
| *B01J 19/02* | (2006.01) | |
| *B01F 3/08* | (2006.01) | |

(Continued)

(52) U.S. Cl.
CPC .............. *B01J 19/26* (2013.01); *B01F 3/0861* (2013.01); *B01F 5/0609* (2013.01); *B01F 5/20* (2013.01); *B01F 15/00162* (2013.01); *B01F 15/00357* (2013.01); *B01J 14/00* (2013.01); *B01J 19/0006* (2013.01); *B01J 19/02* (2013.01); *B01F 2215/0036* (2013.01); *B01J 2219/00162* (2013.01)

(58) Field of Classification Search
CPC ... B01J 14/00; B01J 19/26; B01J 19/02; B01J 19/0006; B01J 2219/00162; B01F 5/20; B01F 5/205; B01F 5/0609; B01F 3/0861; B01F 3/0865; B01F 15/00162; B01F 15/00357; B01F 2215/0036
See application file for complete search history.

(56) References Cited

U.S. PATENT DOCUMENTS

| | | | | | |
|---|---|---|---|---|---|
| 4,508,265 | A | * | 4/1985 | Jido ...................... | B01F 5/0262 239/3 |
| 8,083,395 | B2 | * | 12/2011 | Etzenbach .............. | B01F 5/205 366/137.1 |

FOREIGN PATENT DOCUMENTS

| | | |
|---|---|---|
| CN | 204107416 U | 1/2015 |
| TW | M374913 U1 | 3/2010 |
| TW | I549745 B | 9/2016 |

* cited by examiner

*Primary Examiner* — Lessanework Seifu
(74) *Attorney, Agent, or Firm* — Rosenberg, Klein & Lee (57) ABSTRACT

A mixing apparatus includes a first and a second feeding tube, a first and a second atomizing/refining dose control device, and a reaction chamber. The first and second feeding tubes are arranged in a multi-sleeves manner. The first and second atomizing/refining dose control devices are respectively disposed on terminal ends of the first and second feeding tubes. The reaction chamber accommodates the first and second feeding tubes and the first and second atomizing/refining dose control devices and has a liquid dose mixing wall. The first and second feeding tubes respectively receive a first and a second liquid dose. The first and second atomizing/refining dose control devices respectively atomize or refine the first and second liquid doses and spray the atomized or refined first and second liquid doses on a surface of the liquid dose mixing wall, so as to mix the first and second liquid doses.

19 Claims, 6 Drawing Sheets

(51) Int. Cl.
  *B01F 5/06* (2006.01)
  *B01F 15/00* (2006.01)
  *B01F 5/20* (2006.01)

APPARATUS FOR MIXING MATERIALS WHICH HAVE A HIGH MIX PROPORTION/RATIO THEREBETWEEN AND PREPARATION PRODUCTION SYSTEM USING THE SAME

REFERENCE TO RELATED APPLICATIONS

This non-provisional application claims priority claim under 35 U.S.C. § 119(a) on Taiwan Patent Application No. 108105890 filed Feb. 21, 2019 the entire contents of which are incorporated herein by reference.

FIELD OF THE INVENTION

The invention relates to a mixing apparatus for producing preparations mixed by materials which have a high mix proportion/ratio therebetween and a preparation production system using the same, more particularly, to a mixing apparatus and a preparation production system using the same that are reduced in size and has better mixing efficiency.

BACKGROUND

In semiconductor process, optoelectronic process, pharmaceutical process, chemical process, food process, or other processes, preparations mixed by different liquid doses are often required to prepare the product or to aid the production. During the material-mixing process of the preparation production, a large volume difference may exist between different liquid doses due to reacting time and mix ratio, in other words, the multiple liquid doses have, between them, a high mix proportion/ratio.

Conventionally, liquid doses having a high mix proportion/ratio between them are mixed by controlling the feeding ratio and injecting the liquid doses with a single injection hole or injection channel, wherein the liquid dose with smaller quantity is injected into the liquid dose with larger quantity by a single point and then the two liquid doses are stirred to mix them together. However, the mixing result obtained by this method is poor. In addition, in situations where there is a fast reaction between the liquid doses, the mixture may have defects, like acid-base neutralized polymer, unsuccessful mixing or poor mixing, due to the fact that the liquid doses were unable to be distributed evenly in the mixing process. On the other hand, the conventional mixing devices used in the semiconductor or optoelectronic factories are mostly equipment consist of large tanks combined with long pipeline systems, which take up a large space and is difficult to be moved or is a fixed facility.

SUMMARY

Therefore, to overcome the deficiencies in the conventional technology, an object of the invention is to provide an apparatus for mixing materials which have a high mix proportion/ratio therebetween and a preparation production system using the same, wherein a plurality of different liquid doses are atomized/refined and then sprayed on the surface of a liquid dose mixing wall in a reaction chamber, and thus the purpose of mixing the materials evenly, quickly and with high efficiency is achieved. Moreover, the mixing of different doses by the aforementioned mixing apparatus and preparation production system can be completed in a small and limited space, so an extra pre-treatment facility area is not needed, and hence a reduction in the quantity, cost, and space for equipment units is accomplished. In other words, the size of the mixing apparatus and preparation production system of the invention can be miniaturized for easy relocation or portability.

It is then an object of the invention to provide an apparatus for mixing materials which have a high mixing proportion/ratio therebetween. The mixing apparatus includes a first feeding tube, a second feeding tube, a first atomizing/refining dose control device, a second atomizing/refining dose control device, and a reaction chamber. The first and second feeding tubes are arranged in a multi-sleeves manner where the second feeding tube is sleeved over the first feeding tube. The first and second atomizing/refining dose control devices are respectively disposed at one ends of the first and second feeding tubes. The reaction chamber accommodates the first and second feeding tubes and the first and second atomizing/refining does control devices therein and includes a liquid dose mixing wall. The first and second feeding tubes receive, respectively, a first liquid dose and a second liquid dose. The first and second atomizing/refining dose control devices atomize/refine the first and second doses, respectively, for distribution and respectively spray the atomized/refined first and second doses on a surface of the liquid dose mixing wall in the reaction chamber to mix the first and second doses.

Optionally, the mixing apparatus further includes a first dosage control device and a second dosage control device. The first dosage control device is disposed at the other end of the first feeding tube for receiving the first liquid dose and adjusting a feeding dosage and a pressure of the first liquid dose so as to input the first liquid dose to the first feeding tube. The second dosage control device is disposed at the other end of the second feeding tube for receiving the second liquid dose and adjusting a feeding dosage and a pressure of the second liquid dose so as to input the second liquid dose to the second feeding tube.

Optionally, the mixing apparatus further includes an end mixer disposed at one end of the reaction chamber for mixing the first and second doses flown down from the surface of the liquid dose mixing wall.

Optionally, the surface of the liquid dose mixing wall is a smooth surface.

Optionally, the liquid dose mixing wall includes at least one drainage pattern on the surface.

Optionally, the first and second feeding tubes are horizontally parallel and overlapping or are horizontally parallel and staggered.

Optionally, each of the first and second atomizing/refining dose control devices includes at least one microporous structure disposed on a side thereof.

Optionally, the liquid dose mixing wall is made of a corrosion-resistant hydrophobic material or is coated or plated with the corrosion-resistant hydrophobic material on the surface.

Another object of the invention is to provide a preparation production system that includes the aforementioned mixing apparatus, a first pressure-regulating device, a second pressure-regulating device, and a preparation output device. The mixing apparatus is connected to the first and second pressure-regulating devices and the preparation output device.

Optionally, the preparation production system further includes a first monitoring and verification device, a second monitoring and verification device, and a real-time monitoring device. The first monitoring and verification device is disposed between the first pressure-regulating device and the mixing apparatus. The second monitoring and verification device is disposed between the second pressure-regulating device and the mixing apparatus. The real-time monitoring device is disposed between the preparation output device and the mixing apparatus.

In short, the invention provides a mixing apparatus for producing preparations and a preparation production system using the same that is capable of mixing materials with a high mix proportion/ratio therebetween evenly and quickly in a small facility and with low cost.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

According to embodiments of the invention, an apparatus for mixing materials which have a high mix proportion/ratio therebetween and a preparation production system using the same are provided, wherein several different liquid doses are separately atomized or refined and then sprayed on a same surface of a liquid dose mixing wall of a reaction chamber, so as to mix the different liquid doses on a layer-by-layer (coating to coating) basis, thereby mixing the materials having a high mix ratio proportion/ratio therebetween evenly and quickly. Through the aforementioned mixing apparatus and preparation production system, the mixing can be completed in a small and confined space or area, and therefore the invention has the technical benefits of requiring less facility space and cost and can be easily relocated to be close to the product processing line which would save on factory facilities and costs. Moreover, the aforementioned mixing apparatus may be a mini apparatus with capacity of 300 milliliter or less or a mega apparatus with capacity up to multi-tons, or anything in-between, and there is no limitation on the type or the mass of the liquid dose used for mixing.

The mixing apparatus and the production system using the same according to embodiments of the invention can achieve the object of mixing materials having a high mix proportion/ratio therebetween. In correspondence to the reaction time between the mixed liquid doses, some liquid doses with small quantity can be quickly integrated into other liquid doses with large quantity to obtain the best dose-mixing reaction efficiency. For example, the ratio between liquid doses can be from 1:10 to 1:500, but the invention is not limited thereby. The aforementioned mixing apparatus and the preparation production system using the same can be used in many fields, such as the chemical or slurry preparation in semiconductor or optoelectronics industries, unique functional-medicine preparation for special medical treatment, medicine preparation for general medical treatment, preparation of chemicals with fast reaction rate like KOH, preparation of other chemical substances, food preparation mixed with nutritional supplements or spices.

In general, the apparatus for mixing materials having a high mix proportion/ratio therebetween according to an embodiment of the invention is a multiple-input and single-output mixing apparatus that can precisely mix the materials in a limited mixing space. The mixing apparatus includes a plurality of feeding tubes, a plurality of atomizing/refining dose control devices and a reaction chamber, wherein the plurality of feeding tubes correspondingly connect to the plurality of atomizing/refining dose control devices, and the reaction chamber accommodates the plurality of feeding tubes and the plurality of atomizing/refining dose control devices and includes a liquid dose mixing wall. The plurality of feeding tubes receive a plurality of different liquid doses, and the plurality of atomizing/refining dose control devices atomize/refine these different liquid doses for distribution and spray the atomized/refined liquid doses on a surface of the liquid dose mixing wall in the reaction chamber to mix the different liquid doses, wherein the surface of the liquid dose mixing wall is smooth or non-smooth.

Figure 1:
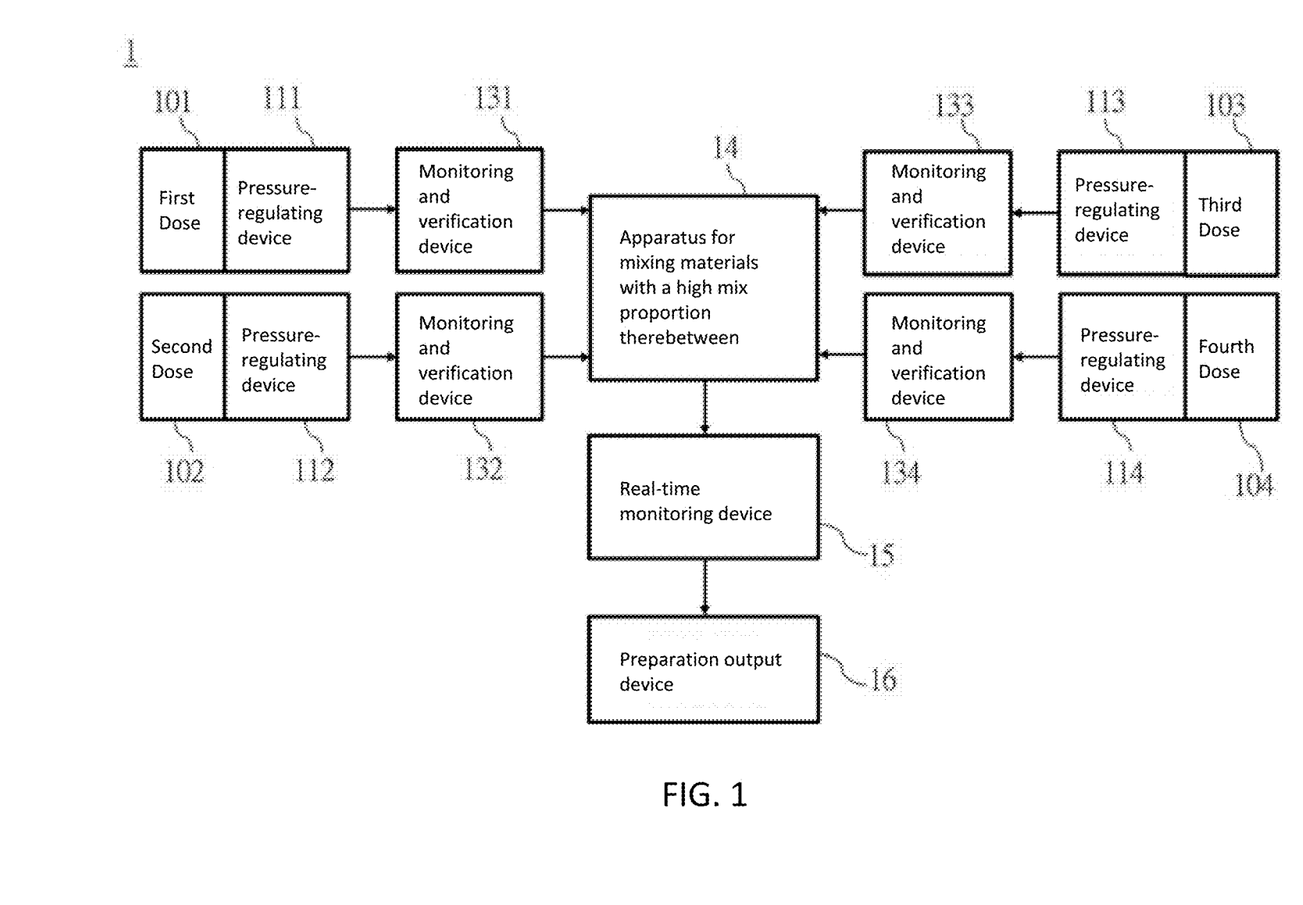
FIG. 1 is a functional block diagram of a preparation production system according to an embodiment of the invention.
Figure 2:
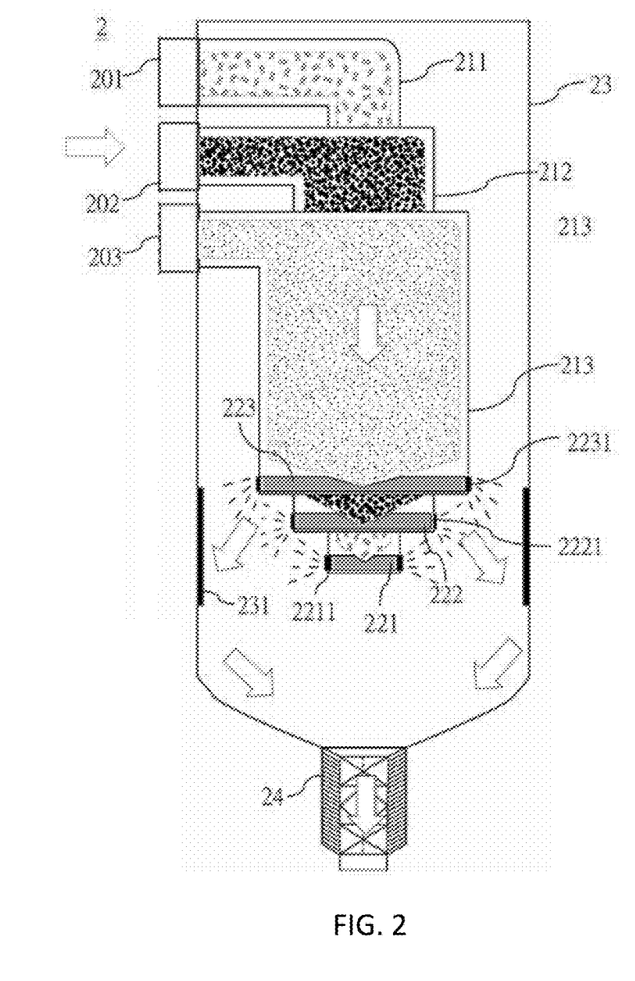
FIG. 2 is a schematic sectional side view of a mixing apparatus according to an embodiment of the invention.
Figure 3A:
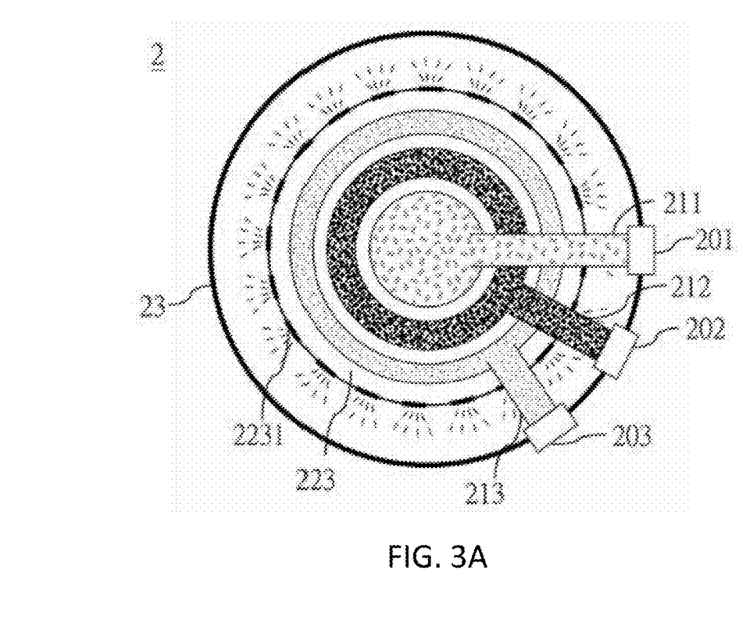
FIG. 3A is a schematic sectional top view of a mixing apparatus according to an embodiment of the invention.
Figure 3B:
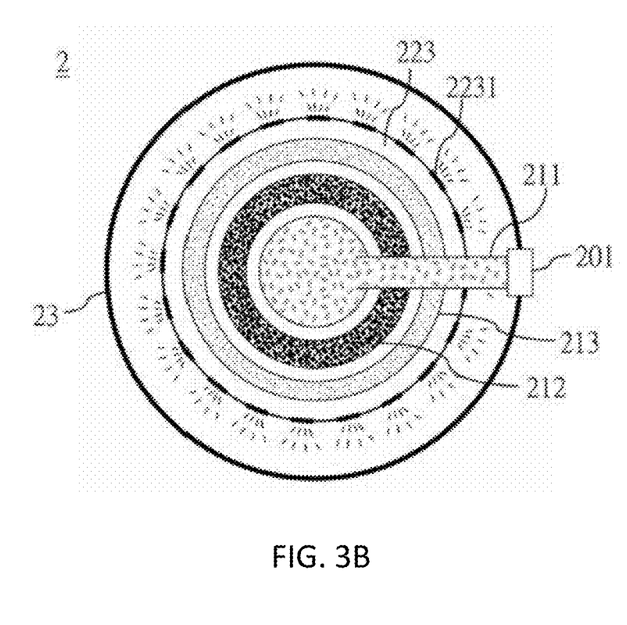
FIG. 3B is a schematic sectional top view of a mixing apparatus according to another embodiment of the invention.
Figure 3C:
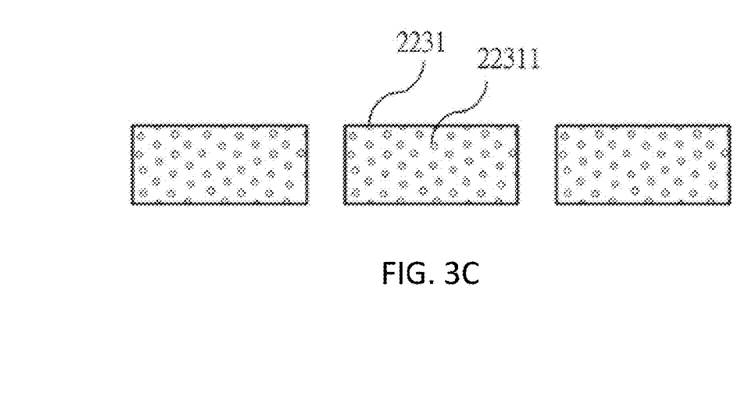
FIG. 3C is a schematic side view illustrating a plurality of microporous structures on an atomizing/refining dose control device of a mixing apparatus according to an embodiment of the invention.
Figure 4A:
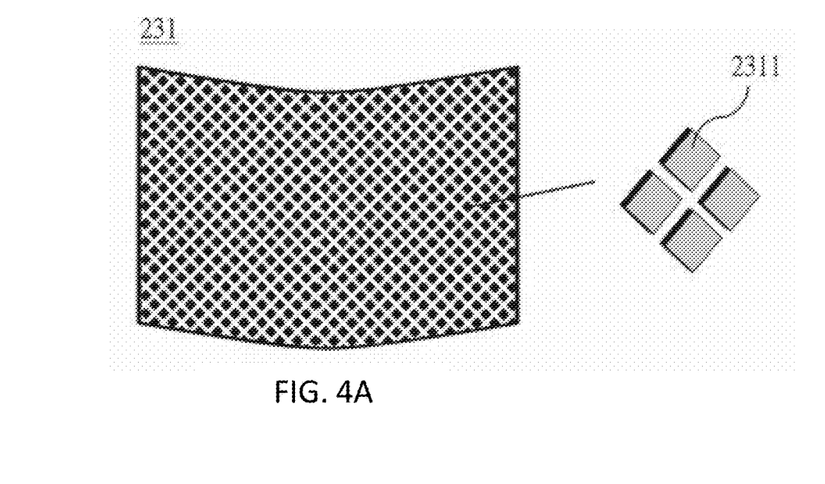
FIG. 4A is a schematic front view of a liquid dose mixing wall in a reaction chamber of a mixing apparatus according to an embodiment of the invention.
Figure 4B:
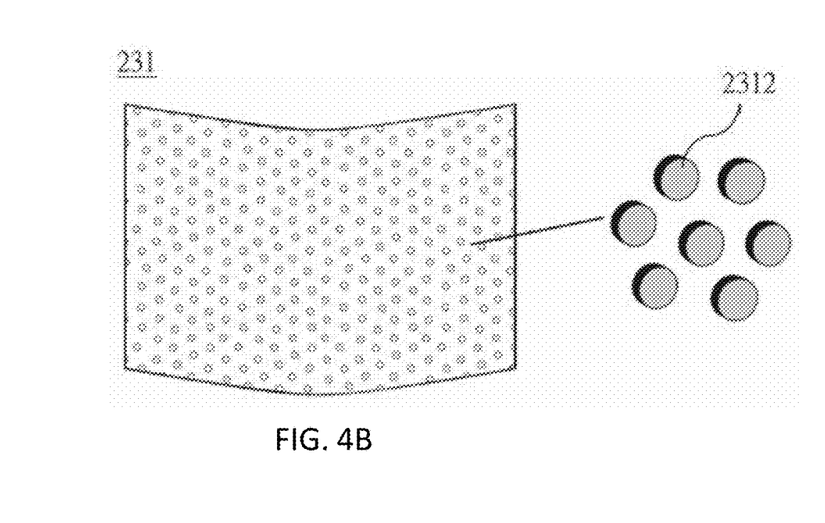
FIG. 4B is a schematic front view of a liquid dose mixing wall in a reaction chamber of a mixing apparatus according to another embodiment of the invention.
Figure 4C:
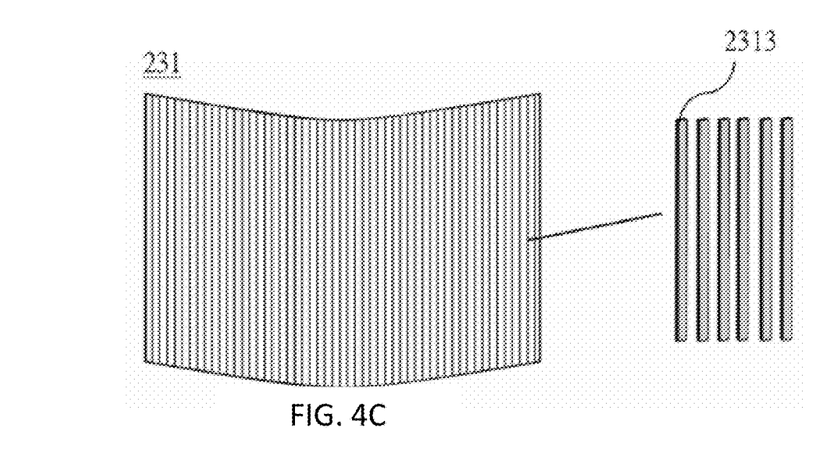
FIG. 4C is a schematic front view of a liquid dose mixing wall in a reaction chamber of a mixing apparatus according to yet another embodiment of the invention.
Figure 4D:
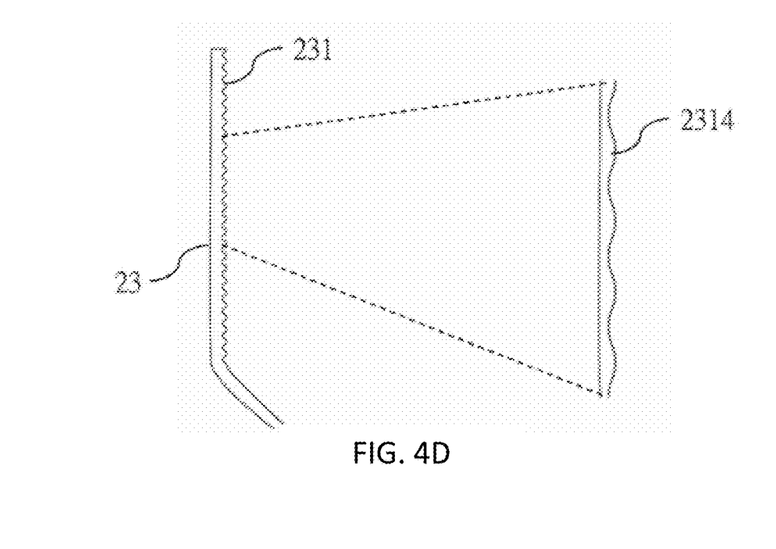
FIG. 4D is a schematic sectional side view of a liquid dose mixing wall in a reaction chamber of a mixing apparatus according to yet another embodiment of the invention.

FIG. 1 is a functional block diagram of a preparation production system according to a preferred embodiment of the invention. Referring to FIG. 1, the preparation production system 1 includes a plurality of pressure-regulating devices 111-114, a plurality of monitoring and verification devices 131-134, an apparatus for mixing materials having a high mix proportion/ratio therebetween 14, a real-time monitoring device 15, and a preparation output device 16. The pressure-regulating devices 111-114 are respectively connected to the monitoring and verification devices 131-134, and the monitoring and verification devices 131-134 are also connected to the mixing apparatus 14. The mixing apparatus 14 is connected to the real-time monitoring device 15, and the monitoring device 15 is also connected to the preparation output device 16.

The pressure-regulating devices 111-114 receive, respectively, a first, a second, a third, and a fourth doses 101-194, wherein the first to fourth doses 101-194 are mainly liquids and the types thereof are not limited in anyway; the doses can be, for example, semiconductor slurry, chemical liquids, solid-contained liquids, or other liquids that require mixing. The pressure-regulating devices 111-114 regulate the pressures in the pipelines and modulate the dose flow so that the first to fourth doses 101-114 are transported with stable flow and speed.

The monitoring and verification devices 131-134 respectively verifies whether the qualities of the first to fourth doses 101-104 meet a production standard to determine whether to input the first to fourth doses 101-104 to the mixing apparatus 14. The verification test includes testing at least one of pH, concentration, particle distribution, particle size, specific gravity, temperature, density, conductivity, pressure, flow rate, and mass. Correspondingly, the monitoring and verification devices 131-134 include the essential elements and functions for the aforementioned tests.

The mixing apparatus 14 mixes the first to fourth doses 101-104 according to different ratios by spraying, in small mists of water fog, the first to fourth doses 101-104 on the surface of the liquid dose mixing wall of the reaction chamber. Preferably, the mixing apparatus 14 further includes an end mixer disposed at one end of the reaction chamber to conduct a second mixing of the doses. The mixing apparatus 14 will later be described and thus is not put in details herein.

The real-time monitoring device 15 receives the preparation produced by the mixing apparatus 14 and determines whether the preparation meets the quality standard. In other words, the real-time monitoring device 15 verifies and tests the liquid characteristic of the preparation to determine whether to output the preparation, wherein the verification test includes testing at least one of pH, concentration, particle distribution, particle size, specific weight, temperature, density, conductivity, pressure, flow rate, and mass. Correspondingly, the real-time monitoring device 15 includes the essential elements and functions for the aforementioned tests.

The preparation output device 16 receives the preparation output from the real-time monitoring device 15 and as well as an incoming-request command from a user end, so as to provide, based on the dosage requested in the incoming-request command and in consideration of the transporting pressure and pulsation control in the pipeline, a corresponding volume of the dosage to the user end.

During the operation, each of the pressure-regulating devices 111-114 regulates the pressure in each pipeline before transporting the first to fourth doses 101-104 respectively to the monitoring and verification devices 131-134. If the pressure is uneven, then the evaluation of the verification may fail and the ratio calculation and supply of the first to fourth doses 131-134 in the subsequent mixing stage would be affected. Moreover, before the mixed preparation is output, the real-time monitoring device 15, other than monitoring the quality of the preparation, also controls the pressure-regulating devices 111-114, the monitoring and verification devices 131-134, the mixing apparatus 14, and the preparation output device 16 for commanding operations like collecting data, production scheduling, or safe shutdown of the production. It is to be noted that the preparation production system 1 is merely one of the embodiments of the invention, wherein when the quality of the preparation is less of a concern or not as cared, the monitoring and verification devices 131-134 and the real-time monitoring device 15 may be removed from and not be implemented in the preparation production system 1.

Next, the apparatus for mixing materials which have a high mix proportion/ratio therebetween is described herein. FIG. 2 is a schematic sectional side view of a mixing apparatus according to an embodiment of the invention. Although the mixing apparatus 14 in FIG. 1 is input with four doses (first to fourth doses 101-104) and the mixing apparatus 2 in FIG. 2 is depicted to be input with three doses, through the description of the mixing apparatus 2, person skilled in the art would know how to implement the mixing apparatus 14 with four doses input thereto.

Referring to FIG. 2, the mixing apparatus 2 includes a plurality of dosage control devices 201-203, a plurality of feeding tubes 211-213, a plurality of atomizing/refining dose control devices 221-223, a reaction chamber 23, and an end mixer 24. Each of the dosage control devices 201-203 respectively connects to a first end of each of the feeding tubes 211-213, and each of the atomizing/refining dose control devices 221-223 respectively connects to a second end of the each of the feeding tubes 211-213. The feeding tubes 211-213 are in a layered configuration, for instance, when viewing from atop, they are concentric circles vertically offset outward and arranged concentrically in vertical layers to isolate the liquid doses in the feeding tubes 211-213 as shown in FIGS. 3A and 3B. The end mixer 24 is disposed at one end of the reaction chamber 23.

The dosage control devices 201-203 are used to receive different liquid doses and capable of adjusting the feeding dosage and pressure to input the received liquid doses respectively to the feeding tubes 211-213. Referring to FIGS. 2, 3A, and 3B, the feeding tubes 211-213 are several pipelines in an offset arrangement (on a vertical distribution plan). In addition, the first ends of the feeding tubes 211-213 can be located either at the same-side region or at regions on different sides of the reaction chamber 23. It is to be noted that in some situations, the dosage control devices 201-203 are not essential elements, whereby the feeding is then simply controlled by the atomizing/refining dose control devices 221-223.

As shown in FIG. 3A, the feeding tubes 211-213 are horizontally parallel and staggered (on a horizontal distribution plan) and the first ends of the feeding tubes 211-213 are located at regions on different sides of the reaction chamber 23. The feeding tubes 211-213 shown in FIG. 3B are horizontally parallel and overlapping each other such that the first ends of the feeding tubes 211-213 are located on the same-side region of the reaction chamber 23, and thus the consistency and minimal-space configuration of the feeding tubes 211-213 need not be considered, and the diameters of the feeding tubes 211-213 are less limited by space arrangement. Simply, the feeding tubes 211-213 are arranged in a multi-sleeves manner in a limited space to form multiple channels for liquid doses and to create a controlled space, so that feeding with a specific pressure is made possible. The arrows in FIG. 2 represent the feeding directions of the liquid doses.

The atomizing/refining dose control devices 221-223 receive the liquid doses from the feeding tubes 211-213, atomize/refine the liquid doses for distribution, minimizing or atomizing or refining the liquid doses into sprayable particles, and spray the atomized/refined liquid doses on a surface of a liquid dose mixing wall 231 in the reaction chamber 23. In this embodiment, the atomizing/refining dose control devices 221-223 include a plurality of microporous structures 2211, 2221, 2231 disposed on the sides thereof. The microporous structures 2211, 2221, 2231 and their micropores can be disposed in intervals, like the microporous structure 2231 shown in FIG. 3C has a plurality of micropores 22311 disposed in intervals and a plurality of the microporous structures 2231 are disposed in intervals, or without intervals, wherein the diameter of the micropores may vary depending on the characteristics of the liquid dose. Moreover, to obtain a finer spraying effect, besides arranging the micropore structures 2211, 2221, 2231 and the plurality of micropores according to the characteristics of the liquid dose, the atomizing/refining dose control devices 221-223 further may include ultrasonic spraying devices.

Optionally, the atomizing/refining dose control device 221-223 is a feeding device controlled by pneumatic continuous pressure, wherein the atomized/refined liquid dose is sprayed by continuously providing pressure from nitrogen pressurization or a pump to conduct feeding. In addition, pneumatic pump and software are used together to achieve the feeding accuracy of this control method.

Optionally, the atomizing/refining dose control devices 221-223 is a feeding device that feeds by quantitative batches, wherein the atomized/refined liquid dose is sprayed by creating a confined space and squeezing therefrom to conduct feeding with continuous batches. The feeding accuracy of this control method is achieved by the creation of the confined space and together with the mechanical squeezing device.

It is to be noted that the embodiments of the atomizing/refining dose control devices 221-223 do not limit the invention thereby; any device or equipment that is able to atomize or refine the liquid doses in the feeding tubes 211-213 for distribution may be used to realize the invention.

The surface of the liquid dose mixing wall 231 in the reaction chamber 23 acts as a primary mixing zone for liquid doses input to the mixing apparatus 14, wherein the reaction chamber 23 is a cylindrical container or a container of other shapes, and the invention is not limited thereby. Each liquid dose is sprayed, in mists of water fog, evenly on the surface of the liquid dose mixing wall 231 and is mixed in a layer-by-layer (coating-to-coating) manner, and therefore each liquid dose can mix evenly and react in a short time under the circumstance of high mix proportion/ratio. Subsequently, the tiny spray mists of each liquid dose combine to form larger droplets, and then the droplets merge and thereafter flow along the wall surface into the end mixer for a second mixing.

The surface of the liquid dose mixing wall 231 is a smooth surface. The liquid dose mixing wall 231 is made of polytetrafluoroethylene (PTFE), other fluorine-based materials, or other corrosion-resistant and thermal-resistant hydrophobic materials, or is coated or plated with polytetrafluoroethylene (PTFE), other fluorine-based materials, or other corrosion-resistant and thermal-resistant hydrophobic materials on the surface. Since the surface is hydrophobic, each liquid dose being sprayed on the surface of the liquid dose mixing wall 231 and being mixed is quickly flown down through natural paths to the end mixer 24 connected at the end of the reaction chamber 23. The smooth surface is a seamless smooth surface or a smooth surface with seams or slits, wherein the seamed/slitted smooth surface further includes at least one drainage pattern.

Optionally, when the surface of the liquid dose mixing wall 231 is a seamed/slitted smooth surface, it may have different drainage patterns 2311-2314 as shown in FIGS. 4A to 4D, whereby after each liquid dose has been mixed on the surface of the liquid dose mixing wall 231, the liquid doses are guided by the drainage patterns 2311-2314 and drained quickly to the end mixer 24 connected to the end of the reaction chamber 23. In FIGS. 4A to 4D, the drainage patterns 2311-2314 are formed by processing or incised inscription and are, respectively, a polygonal-bump pattern, polygonal being triangular, quadrilateral, pentagonal, or hexagonal, a circular-bump pattern like bumps with circular or oval shape, an elongated-bump pattern, and a wave or curved pattern, but the invention is not limited thereby.

The drainage patterns 2311-2314 are uniformly or non-uniformly distributed on the surface of the liquid dose mixing wall 231, and can be arranged in any combination thereof, for instance, disposing the drainage patterns 2311 and 2312 alternately on the surface of the liquid dose mixing wall 231. It is to be noted that according to the types of different liquid doses, different drainage patterns are designed to enhance the mixing effect and to reduce reaction time.

On the contrary, the surface of the liquid dose mixing wall 231 can also be a non-smooth surface. The selection of a smooth or a non-smooth surface for the liquid dose mixing wall 231 is based on the type of the different liquid doses to enhance the mixing efficiency. Other than that, the non-smooth surface can be a seamless non-smooth surface or a seamed/slitted non-smooth surface, wherein the seamed/slitted non-smooth surface further includes at least one of the aforementioned drainage patterns. In short, the designs of the liquid dose mixing wall 231 are not to be used to limit the invention, but relate to the types of the liquid doses and the requirements of the mixing efficiency. As for most mixings of different liquid doses, the seamed/slitted smooth surface design usually has a better mixing efficiency.

Figure 5A:
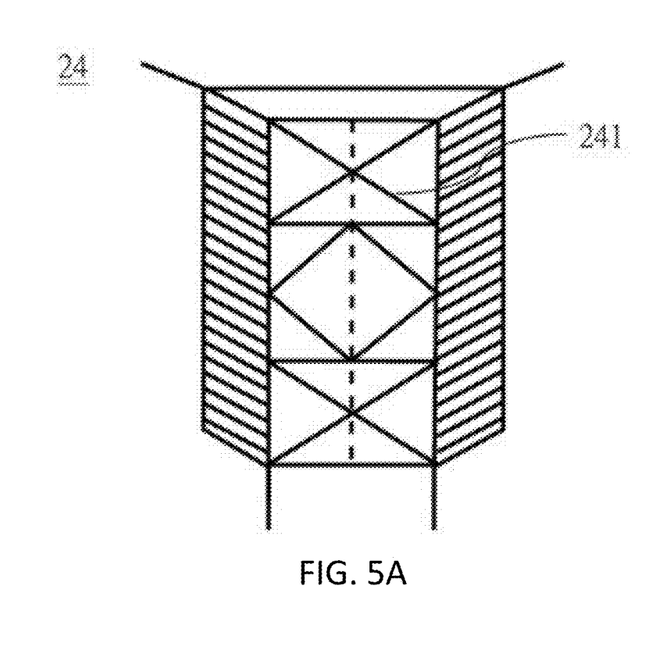
FIG. 5A is a schematic sectional side view of an end mixer of a mixing apparatus according to an embodiment of the invention.

The end mixer 24 is used for a second mixing to enhance the mixing result. After the second mixing, the end mixer 24 transports the mixed preparation to the real-time monitoring device or the preparation output device. In some embodiments, the end mixer 24 is not an essential element. The end mixer 24 can be a non-powered and fixed mixer shown in 5A, or a dynamic mixer shown in FIG. 5B.

Figure 5B:
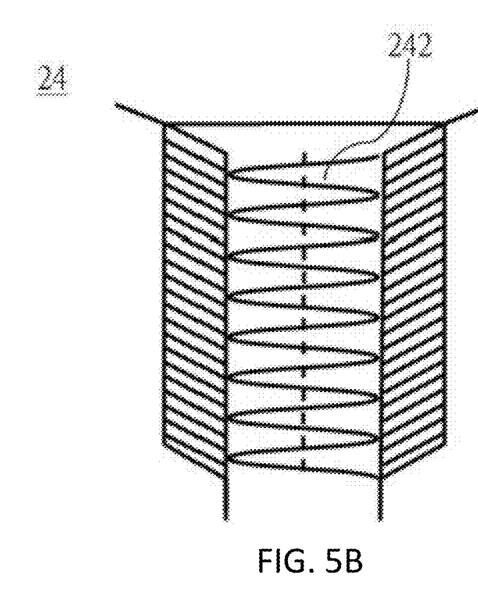
FIG. 5B is a schematic sectional side view of an end mixer of a mixing apparatus according to another embodiment of the invention.

The end mixer 24 is a static mixer in FIG. 5A, which has no moving parts and is composed of staggered fan blades 241 for forming a turbulent flow when the liquid doses pass through so as to mix the liquid doses for a second time. Since the static mixer does not have powered components, the cost is lower. In FIG. 5B, the end mixer 24 is a dynamic mixer with moving parts 241, like a cutter wheel component, that rotates or stirs along and with the axis, which stirs the solid particles in the liquid doses, and thereby enhancing the mixing result and producing preparations with better quality.

In conclusion, the technical benefits of the mixing apparatus and the preparation production system using the same of the invention are:

1) conventional technology mixes the different liquid doses with a single point of entry and so cannot mix the liquid doses of large and small dosages evenly, but the invention provides a mixing apparatus that sprays the different atomized/refined liquid doses on the surface of the liquid dose mixing wall in the reaction chamber to mix the liquid doses in a layer-by-layer (coating-to-coating) manner, and thus the invention can evenly mix the liquid doses of large quantity and small quantity.

2) Each liquid dose in the conventional technology was not treated for distribution before being mixed and so needs to be stirred for a long time, but the mixing apparatus of the invention atomizes or refines the liquid doses for distribution and thus a uniform mixing is assured. And, optionally, an end mixer is disposed at an end of the reaction chamber for a second mixing and so a better mixing result in a short time is obtained.

3) In the conventional technology, a larger space is required for mixing and stirring and, due to poor mixing rate, a plurality of equipment units are required to operate simultaneously. The conventional technology may even need more equipment unit and pipelines with the setup of pre-treatment area and temporary storage area. In other words, issues like demanding for large space, high manufacturing cost, and inability to move the system, remain in the conventional technology. The mixing apparatus and the preparation production system of the invention can mix different liquid doses in a confined space and has a high mixing efficiency and a high mixing speed, so the pre-treatment area is not needed and thereby reducing the number of equipment units, the setup cost and the space occupied, and the aforementioned mixing apparatus and the preparation production system can be miniaturized for easy relocation or portability.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. An apparatus for mixing materials having a high mix proportion therebetween, comprising:
   a first feeding tube for receiving a first liquid dose;
   a second feeding tube for receiving a second liquid dose and sleeved over the first feeding tube;
   a first atomizing or refining dose control device disposed at one end of the first feeding tube for atomizing or refining the first liquid dose;
   a second atomizing or refining dose control device disposed at one end of the second feeding tube for atomizing or refining the second liquid dose; and
   a reaction chamber accommodating the first feeding tube, the second feeding tube, the first atomizing/refining dose control device, and the second atomizing/refining dose control device therein and comprising a liquid dose mixing wall, wherein the liquid dose mixing wall comprises at least one drainage pattern on the surface;
   wherein the first atomizing/refining dose control device and the second atomizing/refining dose control device respectively spray the atomized/refined first liquid dose and the atomized/refined second liquid dose on a surface of the liquid dose mixing wall to mix the first liquid dose and the second liquid dose.

2. The apparatus of claim 1, further comprising:
   a first dosage control device disposed at the other end of the first feeding tube, for receiving the first liquid dose and adjusting a feeding dosage and a pressure of the first liquid dose to input the first liquid dose to the first feeding tube; and
   a second dosage control device disposed at the other end of the second feeding tube, for receiving the second liquid dose and adjusting a feeding dosage and a pressure of the second liquid dose to input the second liquid dose to the second feeding tube.

3. The apparatus of claim 1, further comprising:
   an end mixer disposed at one end of the reaction chamber for mixing the first liquid dose and the second liquid dose flown down from the surface of the liquid dose mixing wall.

4. The apparatus of claim 1, wherein the surface of the liquid dose mixing wall is a smooth surface.

5. The apparatus of claim 1, wherein the first feeding tube and the second feeding tube are horizontally parallel and overlapping or are horizontally parallel and staggered.

6. The apparatus of claim 1, wherein each of the first atomizing/refining dose control device and the second atomizing/refining dose control device comprises at least one microporous structure disposed on a side thereof.

7. The apparatus of claim 1, wherein the surface is made of a corrosion-resistant hydrophobic material or is coated or plated with the corrosion-resistant hydrophobic material.

8. A preparation production system comprising:
   a mixing apparatus according to claim 1;
   a first pressure-regulating device connected to the mixing apparatus;
   a second pressure-regulating device connected to the mixing apparatus; and
   a preparation output device connected to the mixing apparatus.

9. The preparation production system of claim 8, further comprising:
   a first monitoring and verification device disposed between the first pressure-regulating device and the mixing apparatus;
   a second monitoring and verification device disposed between the second pressure-regulating device and the mixing apparatus; and
   a real-time monitoring device disposed between the preparation output device and the mixing apparatus.

10. The preparation production system of claim 8, wherein the mixing apparatus further comprises a first dosage control device and a second dosage control device, the first dosage control device is disposed at the other end of the first feeding tube for receiving the first liquid dose and adjusting a feeding dosage and a pressure of the first liquid dose to input the first liquid dose to the first feeding tube, and the second dosage control device is disposed at the other end of the second feeding tube for receiving the second liquid dose and adjusting a feeding dosage and a pressure of the second liquid dose to input the second liquid dose to the second feeding tube.

11. The preparation production system of claim 8, wherein the mixing apparatus further comprises an end mixer disposed at one end of the reaction chamber for mixing the first liquid dose and the second liquid dose flown down from the surface of the liquid dose mixing wall.

12. The preparation production system of claim 8, wherein the liquid dose mixing wall is made of a corrosion-resistant hydrophobic material or the surface of the liquid dose mixing wall is coated or plated with the corrosion-resistant hydrophobic material.

13. The preparation production system of claim 8, wherein the first feeding tube and the second feeding tube are horizontally parallel and overlapping or are horizontally parallel and staggered.

14. The preparation production system of claim 8, wherein each of the first atomizing/refining dose control device and the second atomizing/refining dose control device comprises at least one microporous structure disposed on a side thereof.

15. The preparation production system of claim 9, wherein the mixing apparatus further comprises a first dosage control device and a second dosage control device, the first dosage control device is disposed at the other end of the first feeding tube for receiving the first liquid dose and adjusting a feeding dosage and a pressure of the first liquid dose to input the first liquid dose to the first feeding tube, and the second dosage control device is disposed at the other end of the second feeding tube for receiving the second liquid dose and adjusting a feeding dosage and a pressure of the second liquid dose to input the second liquid dose to the second feeding tube.

16. The preparation production system of claim 9, wherein the mixing apparatus further comprises an end mixer disposed at one end of the reaction chamber for mixing the first liquid dose and the second liquid dose flown down from the surface of the liquid dose mixing wall.

17. The preparation production system of claim 9, wherein the liquid dose mixing wall comprises at least one drainage pattern on the surface, and the liquid dose mixing wall is made of a corrosion-resistant hydrophobic material or the surface of the liquid dose mixing wall is coated or plated with the corrosion-resistant hydrophobic material.

18. The preparation production system of claim 9, wherein the first feeding tube and the second feeding tube are horizontally parallel and overlapping or are horizontally parallel and staggered.

19. The preparation production system of claim 9, wherein each of the first atomizing/refining dose control device and the second atomizing/refining dose control device comprises at least one microporous structure disposed on a side thereof.

\* \* \* \* \*